(12) United States Patent
Chen et al.

(10) Patent No.: US 6,505,345 B1
(45) Date of Patent: Jan. 7, 2003

(54) OPTIMIZATION OF INITIALIZATION OF PARALLEL COMPARE PREDICATES IN A COMPUTER SYSTEM

(75) Inventors: William Y. Chen, Sunnyvale, CA (US); Dong-Yuan Chen, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/483,879

(22) Filed: Jan. 18, 2000

(51) Int. Cl.⁷ .................................................. G06F 9/45
(52) U.S. Cl. ....................................... 717/154; 712/216
(58) Field of Search ......................... 717/159, 151–158, 717/160–161, 149; 712/200–207, 216, 219, 233–239

(56) References Cited

U.S. PATENT DOCUMENTS

| | | | | |
|---|---|---|---|---|
| 5,832,260 A | | 11/1998 | Arora et al. ................ | 712/239 |
| 5,920,716 A | * | 7/1999 | Johnson et al. ............. | 717/141 |
| 5,937,195 A | * | 8/1999 | Ju et al. ..................... | 717/156 |
| 5,999,736 A | | 12/1999 | Gupta et al. ................ | 717/158 |
| 6,026,241 A | * | 2/2000 | Chow et al. ................ | 717/152 |
| 6,170,052 B1 | * | 1/2001 | Morrison .................... | 712/236 |
| 6,192,515 B1 | * | 2/2001 | Doshi et al. ................ | 717/161 |
| 6,286,135 B1 | * | 9/2001 | Santhanam ................. | 717/146 |
| 6,321,330 B1 | * | 11/2001 | Doshi et al. ................ | 712/241 |
| 6,353,883 B1 | * | 3/2002 | Grochowski et al. ....... | 712/240 |

OTHER PUBLICATIONS

Geva–Morris, IA–64 Architecture Disclosure White Paper, Feb. 1999, Intel Developers' Forum.*

Dehnert, J.C., et al., "Compiling for the Cydra 5", *The Journal of Supercomputing*, 7 (1/2), pp. 181–227, (1993).

Kathail, V., et al., "HPL–PD Architecture Specification: Version 1.1", *Hewlett Packard*, Revision of HPL PlayDoh Architecture Specification: Version 1.0, Technical Report HPL–93–80, Feb. 1994, pp. 1–58, (Feb. 2000 (Revised)).

Mahlke, S.A., et al., "Effective Compiler Support for Predicated Execution Using the Hyperblock", *Proceedings of the 25th Annual International Symposium on Microarchitecture (MICRO 25)*, Portland, Oregan, pp. 45–54, (1992).

Park, J.C., et al., "On Predicated Execution", *Hewlet Packard, HPL–91–58*, Software and Systems Laboratory, pp. 1–25, (May 1991).

* cited by examiner

Primary Examiner—Gregory Morse
Assistant Examiner—Hoang-Vu Antony Nguyen-Ba
(74) Attorney, Agent, or Firm—Schwegman, Lundberg, Woessner & Kluth, P.A.

(57) ABSTRACT

An optimization process is disclosed. The process first finds a parallel compare sequence in a program flow, for example using a flow graph. The guarding predicate (gp) is obtained for the compares. If a new dominating predicate (dp) can be found, the process proceeds to determining if compares for the dp generate the correct or needed initial value for the gp. If there are free result slots available, the proper compares are generated and folded into the initialization. If no free slots are available, it is determined if there is a use of a gp between the dp and gp. If not, the dp is renamed to gp, and the proper compares are generated and folded into the initialization. If there is such a use, the guarding predicate of the compares is found and the process reiterates until it ends with the failure to find a new dominating predicate dp.

19 Claims, 11 Drawing Sheets

| Cycle | sequencial compare code |
|---|---|
| 1 | p3,p2 <- cmp cond1 |
| 2 | <p2> p3,p0 <- cmp cond2 |
| 3 | <p3> p4,p0 <- cmp.U cond3 |
| 4 | <p4> p5,p0 <- cmp.U cond4 |
| 5 | <p5> some I5 |
| 6 | fall-through code |

| Cycle | parallel compare code |
|---|---|
| 0 | p3 <- 0 |
| 1 | p3,p0 <- cmp.on.on cond1 |
| 1 | p3,p0 <- cmp.on.on cond2 |
| 2 | <p3> p5 <- 1 |
| 3 | <p3> p5,p0 <- cmp.an.an cond3 |
| 3 | <p3> p5,p0 <- cmp.an.an cond4 |
| 4 | <p5> some |
| 5 | fall-through code |

Cycle optimized parallel compare code
0           p3,p5 <- 0,0
1           p3,p5 <- cmp.on.on cond1
1           p3,p5 <- cmp.on.on cond2
2           <p3> p5,p0 <- cmp.an.an cond3
2           <p3> p5,p0 <- cmp.an.an cond4
3           <p5> some I5
4           fall-through code

FIG. 5

```
20
If (p1 || p2) {
   If (p3 && p4) {
      P5
   }
} else {
   if (p6 || p7) {
      p8
   } else {
      p9
   }
}
p10
```

| Cycle | Parallel compare code |
|---|---|
| 0 | p3 <- 0 |
| 0 | p6,p8 <- 1,0 |
| 1 | p3,p6 <- cmp.on.ac cond1 |
| 1 | p3,p6 <- cmp.on.ac cond2 |
| 2 | <p3> p5 <- 1 |
| 2 | <p6> p9 <- 1 |
| 3 | <p3> p5,p0 <- cmp.an.an cond3 |
| 3 | <p3> p5,p0 <- cmp.an.an cond4 |
| 3 | <p6> p8,p9 <- cmp.on.ac cond6 |
| 3 | <p6> p8,p9 <- cmp.on.ac cond7 |
| 4 | <p5> some I5 |
| 4 | <p8> some I8 |
| 4 | <p9> some I9 |
| 5 | fall-through code |

| Cycle | Optimized parallel compare code |
|---|---|
| 0 | p5 <- 0 |
| 0 | p9,p8 <- 1,0 |
| 1 | p5,p9 <- cmp.on.ac cond1 |
| 1 | p5,p9 <- cmp.on.ac cond2 |
| 2 | p5,p0 <- cmp.an.an <- cond3 |
| 2 | p5,p0 <- cmp.an.an <- cond4 |
| 2 | <p9> p8,p9 <- cmp.on.ac <- cond6 |
| 2 | <p9> p8,p9 <- cmp.on.ac <- cond7 |
| 3 | <p5> some I5 |
| 3 | <p8> some I8 |
| 3 | <p9> some I9 |
| 4 | fall-through code |

FIG. 9

OPTIMIZATION OF INITIALIZATION OF PARALLEL COMPARE PREDICATES IN A COMPUTER SYSTEM

Technical Field of the Invention

The present invention pertains generally to computers, and more particularly to processing of computer instructions in a computer system.

BACKGROUND OF THE INVENTION

Many microprocessors use instruction pipelining as one way to increase instruction throughput, sometimes using very deep instruction pipelines including many pipeline stages and substages. Another approach to improving instruction execution speed is called "out-of-order" execution. In a microprocessor providing for out-of-order execution, instructions may be executed out of program order to take advantage of instruction parallelism. Instruction pipelining and out-of-order execution techniques may be used separately or together in the same microprocessor.

In a microprocessor having a pipelined architecture, instruction throughput is most efficient when the pipeline or pipelines are kept "fall." In other words, it is most advantageous to have instructions being processed at every pipeline stage in each processor clock cycle. To keep an instruction pipeline full, instructions must generally be fetched continuously. Often an instruction pipeline is many pipeline stages deep such that instructions are fetched several clock cycles before they are executed. This can be an issue where the instruction fetched is a program flow control instruction such as a conditional branch instruction.

Conditional branch instructions often rely on data from other instructions for resolution of the condition specified within the instruction. If an instruction effecting the resolution of the condition has not been executed at the time the conditional branch instruction is fetched, the processor does not have the information necessary to resolve the branch instruction. If the branch instruction cannot be resolved because the necessary data is not available, the processor does not know how to direct the program flow and therefore, which instructions are the correct instructions to fetch next.

If the branch instruction is resolved to be taken, the target instruction and instructions sequentially following the target instruction, referred to herein as the target instruction stream, must be fetched. If the branch instruction is resolved to be not taken, instructions sequentially following the branch instruction must be fetched. Thus, the program flow depends on resolution of the branch instruction. Where the branch instruction cannot be resolved at the time it is fetched because the required data is not available, there can be an issue.

Some processors address this issue by using some form of branch prediction logic. Although the use of branch prediction logic can help to improve microprocessor performance, it is virtually impossible to accurately predict the resolution of a branch instruction every time regardless of the branch prediction scheme used. Mispredictions by the branch prediction logic can have a significant impact on microprocessor performance. The microprocessor relies on the branch prediction logic to determine whether to fetch instructions from the sequential instruction stream following the conditional branch instruction or the target instruction stream. A misprediction means that the wrong instructions are being processed in the microprocessor pipeline.

When a misprediction is identified, the processor instruction pipeline is usually "flushed". Thus, instructions in the microprocessor at various phases of execution are cleared from the pipeline and instructions from the correct instruction stream, and thus the correct program flow, must be fetched. Instructions flushed from the pipeline create "bubbles" in the pipeline such that several clock cycles may be required before the next instruction completes execution. Thus, instruction throughput and overall microprocessor performance is compromised.

One approach addresses the misprediction penalty using a method called predication, also referred to as guarding. Predication is actually used in lieu of branch instructions in this approach. Predicate registers are defined by special instructions and these "predicate" registers are associated with subsequent instructions and may be used to guard them. The predicate specifies a condition that determines whether or not the instruction will be executed. Once the condition is resolved, the predicated instructions are executed and the architectural state of the processor is updated appropriately.

Predication can be used to perform parallel compares, which are used to collapse the height of two or more conditional compares for execution in parallel within the same cycle despite output dependency. Parallel 'and' is used for Booleanand conditions and parallel 'or' is used for Boolean-or conditions. Parallel compares that execute simultaneously and write the same target register must write the same value. Parallel-and compares can only write a value of zero, thus the target register must be initialized to a one. Parallel-or compares can only write a value of one, thus the target register must be initialized to a zero.

One drawback of using parallel compares is the initialization of predicate registers. An initialization instruction is an additional instruction at the head of a dependence chain of instructions. For parallel-and compares, the predicate register initialization placement is important because the initial value is true (one). If there is an execution path on which the predicate register is undefined, the initial value should be false (zero) for the path. This situation restricts the initialization of the parallel-and result register to be directly before the parallel compares. Since there is a dependency between the initialization and the parallel compare instruction group, this adds to the overall critical path length. In general, materialization of initialization instructions that are restricted in code motion is not desirable because of the increase in resource usage and addition to the critical path length. Thus, it is desirable to optimize these predicate initialization instructions away.

SUMMARY OF THE INVENTION

According to one embodiment of the invention, there is provided a method and apparatus for finding a parallel compare sequence in a computer program using predication wherein the sequence requires an initialization, and using a predicate defined in the program in advance of the parallel compare sequence to initialize the parallel compares.

BRIEF DESCRIPTION OF THE DRAWINGS

FIGS. 1–5 illustrate one example illustration of an example embodiment of the invention.

FIGS. 6–9 illustrate another example illustration of an example embodiment of the invention.

DETAILED DESCRIPTION OF THE INVENTION

In the following detailed description of the preferred embodiments, reference is made to the accompanying drawings which form a part hereof, and in which is shown by way of illustration specific preferred embodiments in which the invention may be practiced. These embodiments are described in sufficient detail to enable those skilled in the art to practice the invention, and it is to be understood that other embodiments may be utilized and that changes may be made without departing from the spirit and scope of the present invention. The following detailed description is, therefore, not to be taken in a limiting sense, and the scope of the present invention is defined only be the appended claims.

As described in more detail below, the present invention uses the property of the flow graph to recognize opportunities to use previously defined predicates to initialize the parallel compares, thus eliminating the need for additional initialization instructions and reducing the number of cycles required to process a stream of instructions. According to one embodiment of the invention, for a parallel-and compare, a flow graph analysis is used to recognize a dominating predicate register whose value is a one on the path to a group of instructions using a parallel-and compare. For a parallel-or compare, a flow graph analysis recognizes a dominating predicate register whose value is a zero on the path to a group of instructions using a parallel-or. If free compare result slots in the instruction stream are available, the compare instructions in this stream are modified to fold in the predicate initialization. If necessary, the compare opcode is modified to generate the correct predicate values. If free slots are not available, it is detennined if there are no other uses of the dominating predicate register, and if so, renaming is used to fold in the predicate initialization.

Figure 1:
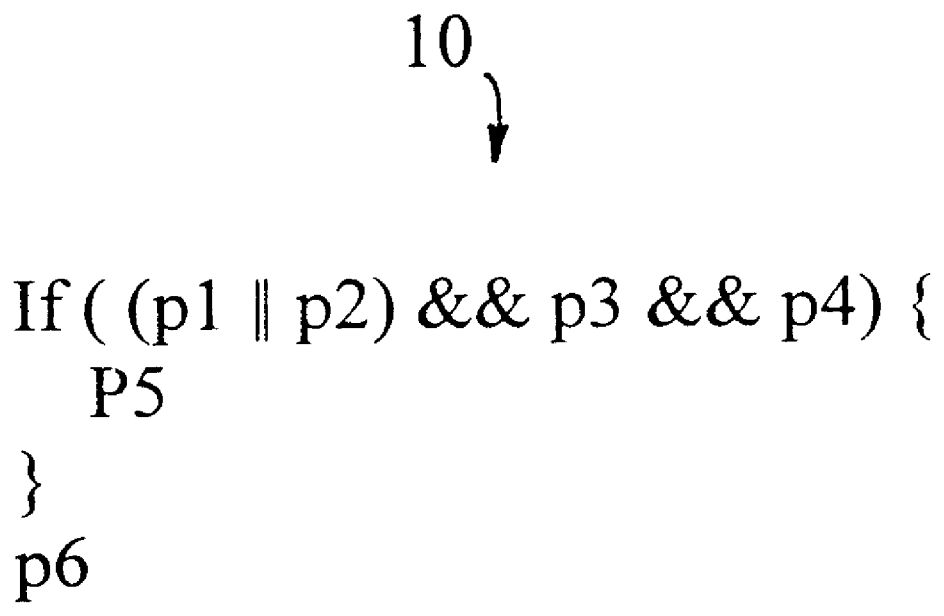
Figure 2:
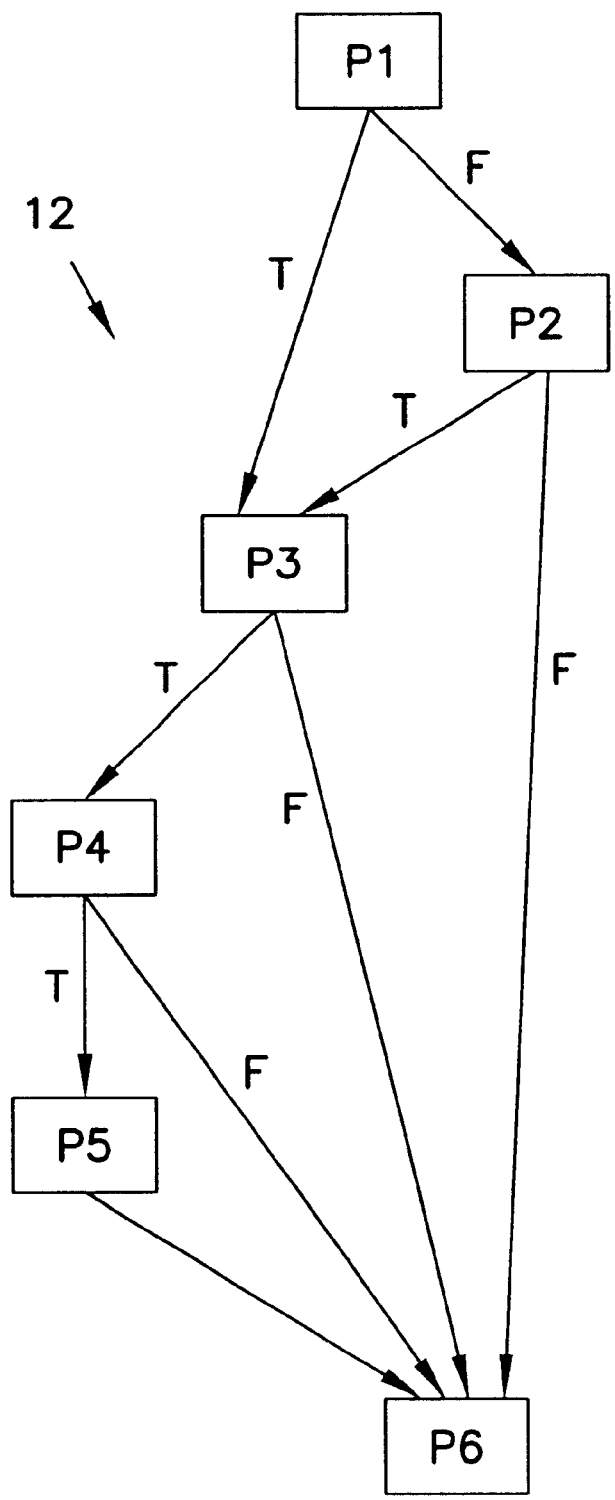

The following is a simple example of when initialization of a predicate compare can be optimized away, according to one embodiment of the invention. FIG. 1 illustrates the original source code 10 corresponding to the flow graph 12 of FIG. 2. FIG. 3 illustrates a code sequence 14 for the source code 10 using sequential compare operations. In this example, the code takes 6 instructions in 6 cycles. FIG. 4 shows the equivalent parallel compare code sequence 16 using traditional initialization technique. Here the sequence takes 8 instructions in 5 cycles. Also, initialization for p3 has no dependence and is assumed to be free, or in other words does not require an additional cycle and is hence represented as cycle 0. This code sequence is an increase of two instructions over sequence 14 due to predicate initialization with a reduction of one cycle. It is noted that the initialization of p5 to a value of '1' cannot be speculated upward due to the uncovered path from p2 to the end block (p6). On that path, p5 should be '0', and an initialization at the entry dominating block produces incorrect code. This initialization thus causes serialization thus producing a sub-optimal code sequence.

FIG. 5 illustrates an example of an optimized code sequence 18. This optimization recognizes that the combined node of p1 and p2 produces a predicate that dominates the parallel-and code sequence, which presents an opportunity to create the initialization of p5. As there is a free predicate definition slot for both of the compares, the initialization can be merged together. The resulting code sequence 18 is 7 instructions and takes 4 cycles.

Figure 7:
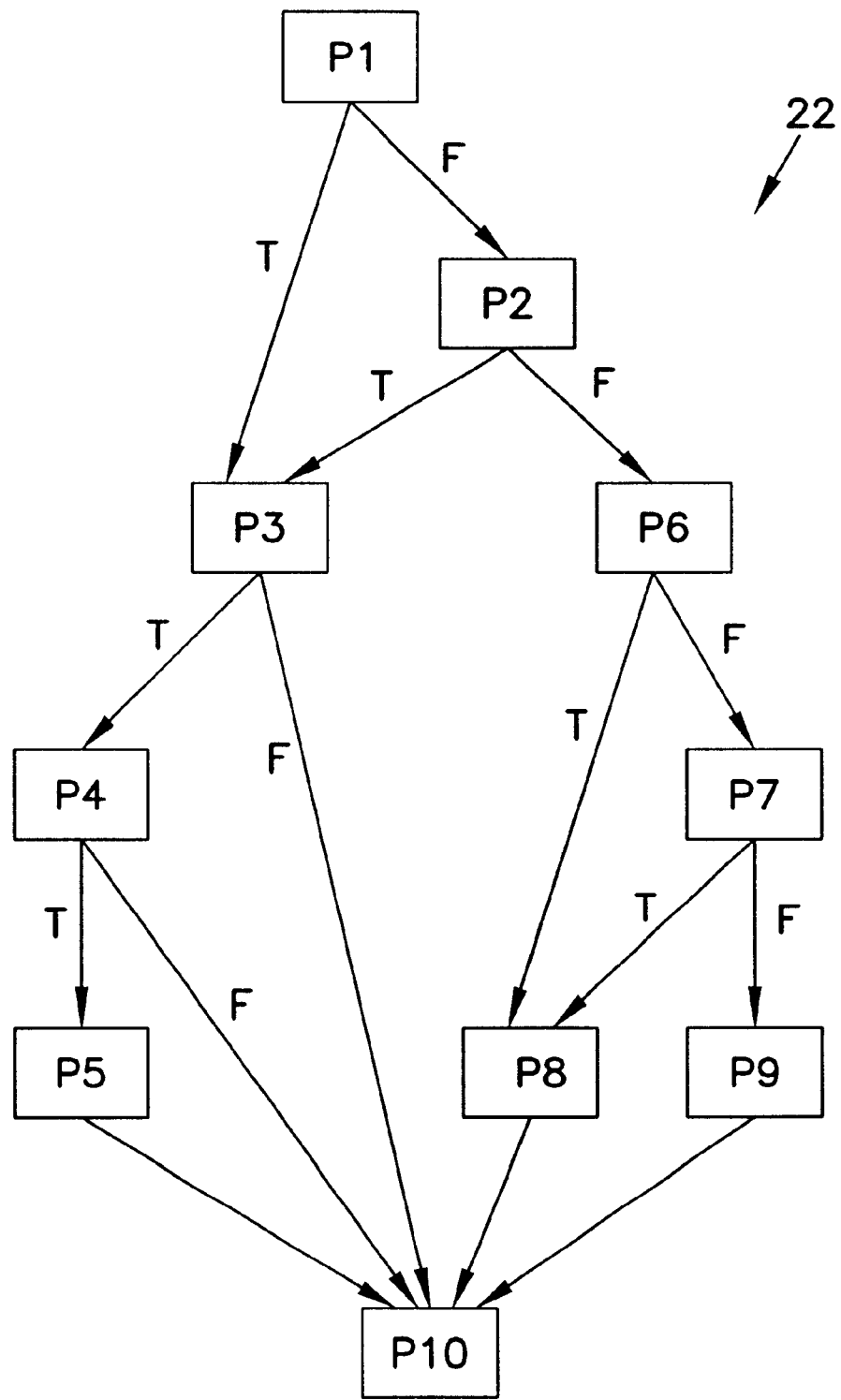

A more complex example of the application of an embodiment of the invention is shown respect to the source code 20 illustrated in FIG. 6, which corresponds to the flow graph 22 shown in FIG. 7. The parallel compare code sequence 24 with a traditional initialization technique is shown in FIG. 8. FIG. 9 illustrates a code sequence 26 which is optimized. Since there is no free predicate result slot available, p3 and p6 are renamed since there is no use of these predicates. It is noted that without renaming, the initialization could not be optimized away. The optimized code sequence 26 saves two initialization instructions and reduces the critical path by one cycle.

Figure 10:
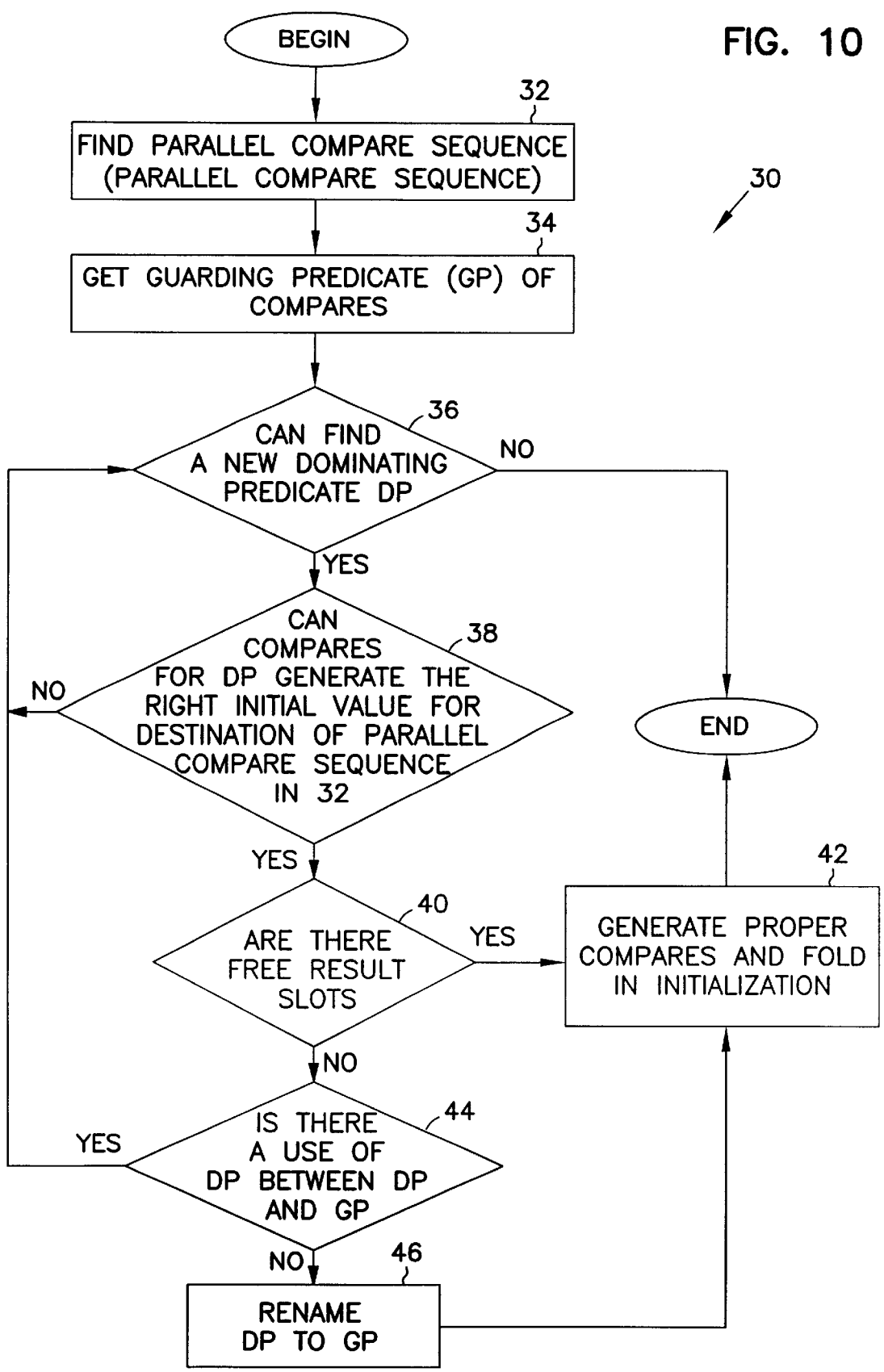
FIG. 10 illustrates a flow chart of an example embodiment of the process of the invention.

Referring now to FIG. 10, there is illustrated a flow chart of an overview of the optimization process 30 according to one example embodiment of the invention. The process first finds a parallel compare sequence 32 in a program flow, for example using a flow graph. The guarding predicate (gp) is obtained for the compares 34. If a new dominating predicate (dp) 36 can be found, the process proceeds to determining 38 if compares for the dp generate the correct or needed initial value for the destination predicate register of the parallel compares in 32. If there are free result slots available 40, the proper compares are generated and folded into the initialization 42. If no free slots are available, it is determined if there is a use of a gp between the dp and gp 44. If not, the dp is renamed 46 to gp, and the proper compares are generated and folded into the initialization 42. If there is such a use, the guarding predicate of the compares is found and the process re-iterates until it ends with the failure to find a new dominating predicate dp.

Figure 11:
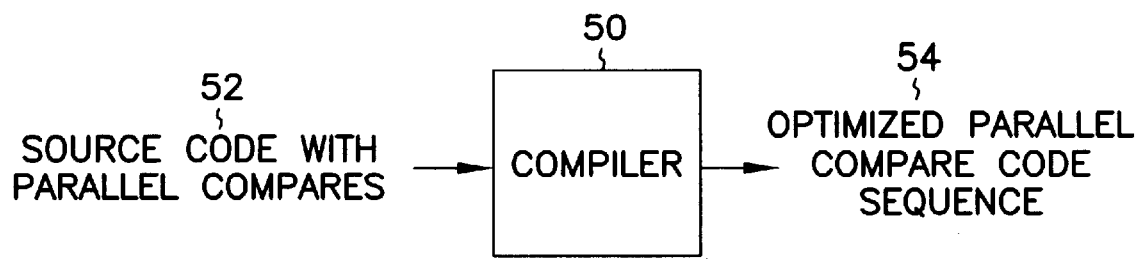
FIGS. 11 and 12 illustrate alternate embodiments of the invention.
Figure 12:
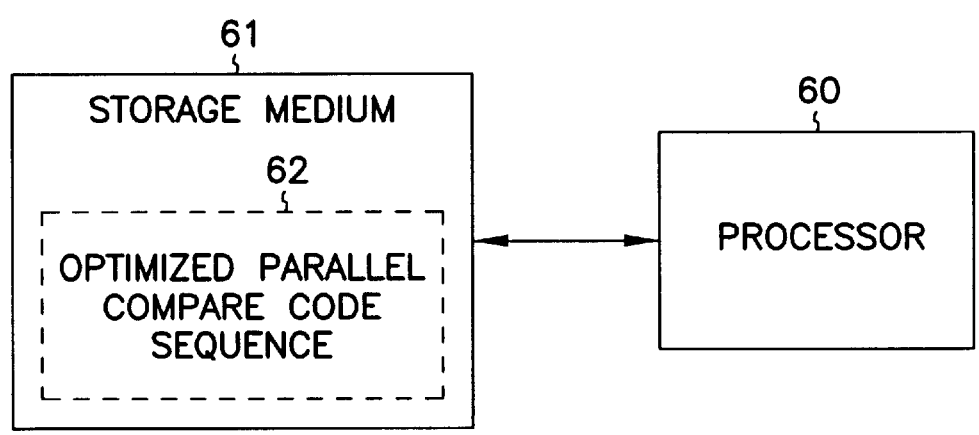

Referring now to FIG. 11, there is illustrated another example embodiment of the invention wherein a compiler 50 receives a source code sequence 52, applies the process of the invention, and outputs an optimized code sequence 54. Another example embodiment of the invention is illustrated in FIG. 12, in which a processor system 60 includes stored therein, in temporary or permanent memory, an optimized code sequence 62, which is in turn executed by the processor system 60. System 60 may, in one embodiment, comprise a microprocessor, or, in another embodiment, comprise a computer system including peripheral devices including mass storage, a display device, input devices, and interconnections to a network.

Thus, there has been described above various embodiments of system, method and apparatus for optimizing parallel compares using predication. These optimizations can reduce the total number of instructions required to execute groups of instructions with parallel compares and/or reduce the number of cycles required to execute such sequences.

What is claimed is:

1. A method comprising:

finding a parallel compare sequence in a computer program using predication wherein the sequence requires an initialization;

using a predicate defined in the program in advance of the parallel compare sequence to initialize the parallel compares, wherein the parallel compare sequence has a guarding predicate, and further wherein the predicate defined in advance of the parallel compare sequence is a dominating predicate; and determining if compares for the dominating predicate can be used to generate the required initial values for the guarding predicate.

2. A method according to claim 1 further including determining if there are free result slots for the dominating predicate and if so generating the compare instructions necessary to provide the required initial values and folding them into the initialization.

3. A method according to claim 1 further including determining if there are free result slots for the dominating predicate and if not determining if there is a use of the dominating predicate between the dominating predicate and the guarding predicate, and if not renaming the dominating predicate to the guarding predicate and generating the compare instructions necessary to provide the required initial values and folding them into the initialization.

4. A compiler comprising a computer program executing on a computer to perform the following process:

finding a parallel compare sequence in a computer program using predication wherein the sequence requires an initialization;

using a predicate defined in the program in advance of the parallel compare sequence to initialize the parallel compares, wherein the parallel compare sequence has a guarding predicate, and further wherein the predicate defined in advance of the parallel compare sequence is a dominating predicate; and determining if compares for the dominating predicate can be used to generate the required initial values for the guarding predicate.

5. A compiler according to claim 4 further including determining if there are free result slots for the dominating predicate and if so generating the compare instructions necessary to provide the required initial values and folding them into the initialization.

6. A compiler according to claim 4 further including determining if there are free result slots for the dominating predicate and if not determining if there is a use of the dominating predicate between the dominating predicate and the guarding predicate, and if not renaming the dominating predicate to the guarding predicate and generating the compare instructions necessary to provide the required initial values and folding them into the initialization.

7. A computer program product comprising computer instructions stored in a machine readable medium, the program executable on a suitable computer platform to perform the following:

finding a parallel compare sequence in a computer program using predication wherein the sequence requires an initialization;

using a predicate defined in the program in advance of the parallel compare sequence to initialize the parallel compares, wherein the parallel compare sequence has a guarding predicate, and further wherein the predicate defined in advance of the parallel compare sequence is a dominating predicate; and determining if compares for the dominating predicate can be used to generate the required initial values for the guarding predicate.

8. A computer program product according to claim 7 further including computer instructions executable on the platform to determine if there are free result slots for the dominating predicate and if so generating the compare instructions necessary to provide the required initial values and folding them into the initialization.

9. A computer program product according to claim 7 further including computer instructions executable on the platform to determine if there are free result slots for the dominating predicate and if not determining if there is a use of the dominating predicate between the dominating predicate and the guarding predicate, and if not renaming the dominating predicate to the guarding predicate and generating the compare instructions necessary to provide the required initial values and folding them into the initialization.

10. A method, comprising:

finding a parallel compare sequence in a computer program that requires an initialization;

obtaining a guarding predicate (gp) for one or more compares in the sequence;

if a new dominating predicate (dp) can be found, determining if the one or more compares for the dp generate the correct or needed initial value for the gp;

if there are free result slots available, generating the proper one or more compares and folding them into the initialization for the sequence;

if no free slots are available, determining if there is a use of a gp between the dp and gp, and if not renaming the dp and generating the proper one or more compares and folding them into the initialization for the sequence;

if there is such a use of a gp between the dp and gp, reiterating the above process starting with finding the gp of the one or more compares.

11. A method according to claim 10 including ending the process if there is a failure to find a new dominating predicate dp.

12. A compiler comprising a computer program executing on a computer to perform the following process:

finding a parallel compare sequence in a computer program that requires an initialization;

obtaining a guarding predicate (gp) for one or more compares in the sequence;

if a new dominating predicate (dp) can be found, determining if the one or more compares for the dp generate the correct or needed initial value for a destination predicate register of the parallel compare sequence;

if there are free result slots available, generating the proper one or more compares and folding them into the initialization for the sequence;

if no free slots are available, determining if there is a use of a gp between the dp and gp, and if not renaming the dp and generating the proper one or more compares and folding them into the initialization for the sequence;

if there is such a use of a gp between the dp and gp, reiterating the above process starting with finding the gp of the one or more compares.

13. A compiler according to claim 12 further including the computer ending the process if there is a failure to find a new dominating predicate dp.

14. A storage medium having associated data stored thereon, wherein the data, when accessed, results in a machine performing:

identifying a parallel compare statement in a program, wherein execution of the parallel compare statement is qualified by a predicate register;

identifying a second compare statement having a free result slot;

determining if the free result slot can be used to initialize the predicate register; and configuring the second compare statement to initialize the predicate register.

15. The storage medium of claim 14 wherein the parallel compare statement comprises a parallel-and statement.

16. The storage medium of claim 14 wherein identifying a parallel compare statement comprises identifying a sequence of parallel compare statements.

17. A storage medium having associated data stored thereon, wherein the data, when accessed, results in a machine performing:

identifying a parallel compare statement in a program, wherein the parallel compare statement has a predicate register as a target;

identifying a second compare statement having a free result slot;

determining if the free result slot can be used to initialize the predicate register; and configuring the second compare statement to initialize the predicate register.

18. The storage medium of claim 17 where the parallel compare statement comprises a parallel-or-statement.

19. The storage medium of claim 17 wherein identifying a sequence of parallel compare statement comprises identifying a sequence of parallel compare statements.

* * * * *

UNITED STATES PATENT AND TRADEMARK OFFICE
CERTIFICATE OF CORRECTION

PATENT NO. : 6,505,345 B1
DATED : January 7, 2003
INVENTOR(S) : Dong-Yuan Chen and William Y. Chen It is certified that error appears in the above-identified patent and that said Letters Patent is hereby corrected as shown below:

Column 1,
Line 24, delete "fall" and insert -- full -- therefor.

Column 2,
Line 22, delete "Booleanand" and insert -- Boolean-and -- therefor.

Column 7,
Line 5, delete "where" and insert -- wherein -- therefor.
Line 6, delete "-" after "or".

Column 8,
Line 2, delete "sequence of" after "a".

Signed and Sealed this

Twentieth Day of July, 2004

JON W. DUDAS
*Acting Director of the United States Patent and Trademark Office*